(12) United States Patent
Ma et al.

(10) Patent No.: US 10,531,432 B2
(45) Date of Patent: Jan. 7, 2020

(54) SYSTEM AND METHOD FOR RESOURCE ALLOCATION FOR SPARSE CODE MULTIPLE ACCESS TRANSMISSIONS

(71) Applicant: Huawei Technologies Co., Ltd., Shenzhen (CN)

(72) Inventors: Jianglei Ma, Ottawa (CA); Ming Jia, Ottawa (CA); Peiying Zhu, Kanata (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 14/668,577

(22) Filed: Mar. 25, 2015

(65) Prior Publication Data
US 2016/0286529 A1 Sep. 29, 2016

(51) Int. Cl.
*H04W 72/04* (2009.01)
*H04J 13/00* (2011.01)

(52) U.S. Cl.
CPC ......... *H04W 72/04* (2013.01); *H04J 13/0003* (2013.01); *H04W 72/044* (2013.01)

(58) Field of Classification Search
CPC . H04W 72/02; H04W 74/08; H04W 74/0825; H04W 72/04; H04W 72/044; H04J 13/00; H04J 13/0003; H04J 13/0074
See application file for complete search history.

(56) References Cited

U.S. PATENT DOCUMENTS

| 6,324,234 | B1 | 11/2001 | Kiasaleh |
| 6,434,133 | B1 | 8/2002 | Hamalainen |
| 7,657,429 | B2 | 2/2010 | Tsushima |
| 8,219,873 | B1 | 7/2012 | Ng et al. |
| 8,245,092 | B2 | 8/2012 | Kotecha et al. |
| 8,451,918 | B1 | 5/2013 | Cheng et al. |
| 8,705,574 | B2 | 4/2014 | Hammarwall et al. |

(Continued)

FOREIGN PATENT DOCUMENTS

| CN | 101034921 A | 9/2007 |
| CN | 101405962 A | 4/2009 |

(Continued)

OTHER PUBLICATIONS

Nikopour, H. et al., "Sparse Code Multiple Access," 2013 IEEE 24th International Symposium on Personal, Indoor and Mobile Radio Communications: Fundamentals and PHY Track, Sep. 8-11, 2013, pp. 332-336, London.

(Continued)

*Primary Examiner* — Michael Thier
*Assistant Examiner* — Prince A Mensah
(74) *Attorney, Agent, or Firm* — Slater Matsil, LLP

(57) ABSTRACT

An embodiment method of resource allocation for sparse code multiple access (SCMA) transmissions includes partitioning a resource block into a plurality of resource regions. The method also includes assigning the plurality of resource regions to respective device groups. The resource region assignments are then signaled to devices of the respective device groups. The method also includes receiving SCMA signals from the devices of the respective device groups. The SCMA signals from one group of the respective device groups are asynchronous with respect to the SCMA signals from another group of the respective device groups.

29 Claims, 5 Drawing Sheets

(56) References Cited

U.S. PATENT DOCUMENTS

| | | |
|---|---|---|
| 8,719,654 B2 | 5/2014 | Kotecha et al. |
| 8,737,509 B2 | 5/2014 | Yu et al. |
| 8,743,981 B2 | 6/2014 | Zhang |
| 9,055,484 B2 | 6/2015 | Feng et al. |
| 2002/0105901 A1 | 8/2002 | Chini et al. |
| 2004/0102222 A1 | 5/2004 | Skafidas et al. |
| 2005/0018837 A1 | 1/2005 | Duvaut et al. |
| 2005/0053121 A1 | 3/2005 | Lakkis |
| 2005/0111462 A1 | 5/2005 | Walton et al. |
| 2005/0152475 A1 | 7/2005 | Lakkis |
| 2005/0157801 A1 | 7/2005 | Gore et al. |
| 2005/0201326 A1 | 9/2005 | Lakkis |
| 2005/0201473 A1 | 9/2005 | Lakkis |
| 2006/0077885 A1 | 4/2006 | Schnell et al. |
| 2006/0087961 A1 | 4/2006 | Chang et al. |
| 2006/0159006 A1 | 7/2006 | Yeon et al. |
| 2006/0160498 A1 | 7/2006 | Sudo |
| 2007/0218942 A1 | 9/2007 | Khan et al. |
| 2008/0051090 A1 | 2/2008 | Kobayashi |
| 2008/0225783 A1 | 9/2008 | Wang et al. |
| 2009/0124261 A1 | 5/2009 | Shimomura |
| 2009/0161793 A1 | 6/2009 | Nentwig |
| 2009/0196379 A1 | 8/2009 | Gan et al. |
| 2009/0219977 A1 | 9/2009 | Iwamatsu |
| 2009/0285122 A1 | 11/2009 | Onggosanusi et al. |
| 2010/0027707 A1 | 2/2010 | Takahashi et al. |
| 2010/0085934 A1 | 4/2010 | Wang et al. |
| 2010/0093288 A1 | 4/2010 | Pan et al. |
| 2010/0115358 A1 | 5/2010 | Kotecha et al. |
| 2010/0220797 A1 | 9/2010 | Namba et al. |
| 2010/0239040 A1 | 9/2010 | Beluri et al. |
| 2011/0034198 A1 | 2/2011 | Chen et al. |
| 2011/0058471 A1 | 3/2011 | Zhang |
| 2011/0087933 A1 | 4/2011 | Varnica et al. |
| 2011/0177499 A1 | 6/2011 | Quake et al. |
| 2011/0170625 A1 | 7/2011 | Blankenship et al. |
| 2011/0176499 A1 | 7/2011 | Siomina et al. |
| 2011/0182332 A1 | 7/2011 | Ericson et al. |
| 2011/0261894 A1 | 10/2011 | Yu et al. |
| 2011/0274123 A1 | 11/2011 | Hammarwall et al. |
| 2012/0076204 A1 | 3/2012 | Raveendran et al. |
| 2012/0170630 A1 | 7/2012 | Peroulas et al. |
| 2012/0183020 A1 | 7/2012 | Koike-Akino et al. |
| 2012/0224554 A1 | 9/2012 | Park |
| 2012/0294382 A1 | 11/2012 | Wang et al. |
| 2012/0300711 A1 | 11/2012 | Wang et al. |
| 2013/0022090 A1 | 1/2013 | Weng et al. |
| 2013/0036338 A1 | 2/2013 | Kotecha et al. |
| 2013/0044661 A1* | 2/2013 | Jokimies ........... H04W 52/0274 370/311 |
| 2013/0094468 A1 | 4/2013 | Ko et al. |
| 2013/0182791 A1 | 7/2013 | Dhakal et al. |
| 2013/0188751 A1 | 7/2013 | Ohlmer et al. |
| 2013/0286959 A1 | 10/2013 | Lou et al. |
| 2014/0064147 A1* | 3/2014 | Wang ..................... H04W 8/005 370/255 |
| 2014/0140289 A1 | 5/2014 | Moulsley |
| 2014/0162544 A1* | 6/2014 | Edge ..................... H04W 8/005 455/3.01 |
| 2014/0226742 A1 | 8/2014 | Yu et al. |
| 2014/0245094 A1 | 8/2014 | Kotecha et al. |
| 2014/0254544 A1* | 9/2014 | Kar Kin Au .......... H04L 5/0033 370/330 |
| 2015/0003542 A1 | 1/2015 | Barbu et al. |
| 2015/0043568 A1* | 2/2015 | Coulon ................. H04B 7/2643 370/350 |
| 2015/0131636 A1 | 5/2015 | Tanaka |
| 2015/0181481 A1* | 6/2015 | Masini ............... H04W 36/0083 455/436 |
| 2015/0304146 A1 | 10/2015 | Yang et al. |
| 2015/0304868 A1* | 10/2015 | Yu ....................... H04W 56/001 370/312 |
| 2015/0358971 A1* | 12/2015 | Soriaga ................. H04L 1/0057 370/329 |
| 2015/0372843 A1 | 12/2015 | Bala et al. |
| 2016/0112992 A1* | 4/2016 | Bhushan ............... H04L 5/0042 370/330 |

FOREIGN PATENT DOCUMENTS

| | | |
|---|---|---|
| CN | 101567714 A | 10/2009 |
| CN | 101860386 A | 10/2010 |
| CN | 101904103 A | 12/2010 |
| CN | 102232319 A | 11/2011 |
| CN | 102439866 A | 5/2012 |
| CN | 103067095 A | 4/2013 |
| CN | 103262453 A | 8/2013 |
| EP | 2479910 A2 | 7/2012 |
| JP | 2008054237 A | 3/2008 |
| JP | 2009526500 A | 7/2009 |
| JP | 2010517389 A | 5/2010 |
| JP | 2014016944 A1 | 1/2014 |
| RU | 2378800 C2 | 1/2010 |
| RU | 105491 U1 | 6/2011 |
| WO | 2007092945 A2 | 8/2007 |
| WO | 2007149961 A1 | 12/2007 |
| WO | 2008007437 A1 | 1/2008 |
| WO | 2010050731 A2 | 5/2010 |
| WO | 2010102435 | 9/2010 |
| WO | 2012048218 A1 | 4/2012 |
| WO | 2013062310 A1 | 5/2013 |

OTHER PUBLICATIONS

Al-Imari, et al., "Low Density Spreading for next generation multicarrier cellular systems," 2012 International Conference on Future Communication Networks (ICFCN), pp. 52-57, Apr. 2-5, 2012.

International Search Report and Written Opinion received in International Application No. PCT/CN2015/075434 dated Jul. 3, 2015, 11 pages.

Zhang, et al., "A Survey on 5G New Waveform: From Energy Efficiency Aspects," IEEE, Date of Conference Nov. 2-5, 2014, 5 pages.

Beko, M., et al., "Designing Good Multi-Dimensional Constellations," IEEE Wireless Communications Letters, vol. 1, No. 3, Jun. 2012, pp. 221-224.

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

International Search Report and Written Opinion received in Application No. PCT/CN2013/087311 dated Feb. 6, 2014, 13 pages.

Van De Beek, J., et al., "Multiple Access with Low-Density Signatures," Huawei Technologies Sweden, IEEE GLOBECOM, 2009 proceedings, 6 pages.

Qiang, Jianfeng et al., "Filter Bank Based Multiuser Receiver for Wireless OFDMA Systems," IEEE International Symposium on Microwave, Antenna, Propagation and EMC Technologies for Wireless Communications Proceedings vol. 2, Aug. 8, 2005, pp. 1123-1126.

Tonello, Andrea M., "Performance Analysis of a Multiple Antenna Concatenated DMT-FMT Scheme in the Uplink," Proceedings of IEEE International Symposium on Wireless Communication Systems, Siena, Italy, Sep. 5-7, 2005, pp. 591-595.

Al-Imari, et al., "Performance Evaluation of Low Density Spreading Multiple Access," 2012, International Wireless Communications and Mobile Computing Conference, Date of Conference: Aug. 27-31, 2012, 7 pages.

Okuyama, T, et al., "A Study on Autonomous Node Synchronization Scheme Based on Periodicity in Cyclic Prefix for Non-Orthogonal Multiple Access," The Institute of Electronics, Information and Communication Engineers, IEICE Technical Report, RCS2013-203, Nov. 2013, 8 pages, vol. 113 No. 301.

* cited by examiner

SYSTEM AND METHOD FOR RESOURCE ALLOCATION FOR SPARSE CODE MULTIPLE ACCESS TRANSMISSIONS

CROSS-REFERENCE TO RELATED APPLICATIONS

This application is related to the co-pending U.S. patent application Ser. No. 14/231,217, titled "Method and Apparatus for Asynchronous OFDMA/SC-FDMA," filed on Mar. 31, 2014, assigned to the assignee hereof, which application is hereby incorporated herein by reference.

TECHNICAL FIELD

The present invention relates generally to sparse code multiple access (SCMA), and, in particular embodiments, to a system and method for group-wise asynchronous SCMA transmissions.

BACKGROUND

SCMA is a non-orthogonal multiple access scheme that allows multiple devices, users, or user equipments (UEs) to share channel resources. Potential transmit devices are allocated time and frequency resources, also referred to as resource units. In SCMA, potential transmit devices are also assigned a sparse codebook that allows superposition of device transmissions, which allows SCMA systems to support more connected devices.

In grant-free SCMA systems, there is no signaling from the network to devices for scheduling transmissions. The devices access the shared channel resources in a contention based manner. Contention based access begins to break down when two or more devices attempt to transmit using the same resources, which is referred to as a collision. SCMA can tolerate some amount of signal collision. SCMA systems can control the probability of collision using collision avoidance and collision detection and recovery techniques to mitigate its impact. For additional information regarding SCMA, refer to U.S. application Ser. No. 13/730, 355, which is hereby incorporated herein by reference.

Base station receivers generally need arriving signals to be synchronized in time in order to receive them correctly and take advantage of low complexity message passing algorithm (MPA) receivers. That synchronizing is typically achieved through signaling from the base station to the transmitting devices indicating timing adjustments to transmit timing.

SUMMARY

An embodiment method of resource allocation for sparse code multiple access (SCMA) transmissions includes partitioning a resource block into a plurality of resource regions. The method also includes assigning the plurality of resource regions to respective device groups. The resource region assignments are then signaled to devices of the respective device groups. The method also includes receiving SCMA signals from the devices of the respective device groups. The SCMA signals from one group of the respective device groups are asynchronous with respect to the SCMA signals from another group of the respective device groups.

An embodiment method of receiving asynchronous SCMA signals includes partitioning a resource block into a plurality of resource regions. The method also includes receiving a first SCMA signal from a first user equipment (UE). The first SCMA signal uses a first resource region of the plurality of resource regions. The method also includes receiving a second SCMA signal from a second UE. The second SCMA signal uses a second resource region of the plurality of resource regions and is asynchronous with respect to the first SCMA signal.

An embodiment base station for SCMA signals includes a processor, an antenna, a mixer, and a plurality of filters. The processor is configured to respectively assign a plurality of resource regions to a plurality of device groups. The antenna is configured to receive asynchronous SCMA signals from a plurality of devices grouped into the plurality of device groups according to respective locations of the plurality of devices. The mixer is coupled to the antenna and configured to convert the asynchronous SCMA signals from a radio frequency to a baseband frequency. The plurality of filters are coupled to the mixer and respectively correspond to the plurality of resource regions. The plurality of filters are also configured to filter inter-resource region interference for each of the plurality of resource regions.

An embodiment method of transmitting an SCMA signal includes receiving a resource region assignment indicating a resource region allocated to a device group of which the UE is a member. The resource region assignment is received at a UE. The method also includes filtering the SCMA signal using a spectrum shaping filter corresponding to the resource region. The filtering is carried out by the UE. The method also includes transmitting the SCMA signal toward a base station using time and frequency resources of the resource region according to the resource region assignment. The transmitting is carried out synchronously with a local timing reference for the device group.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
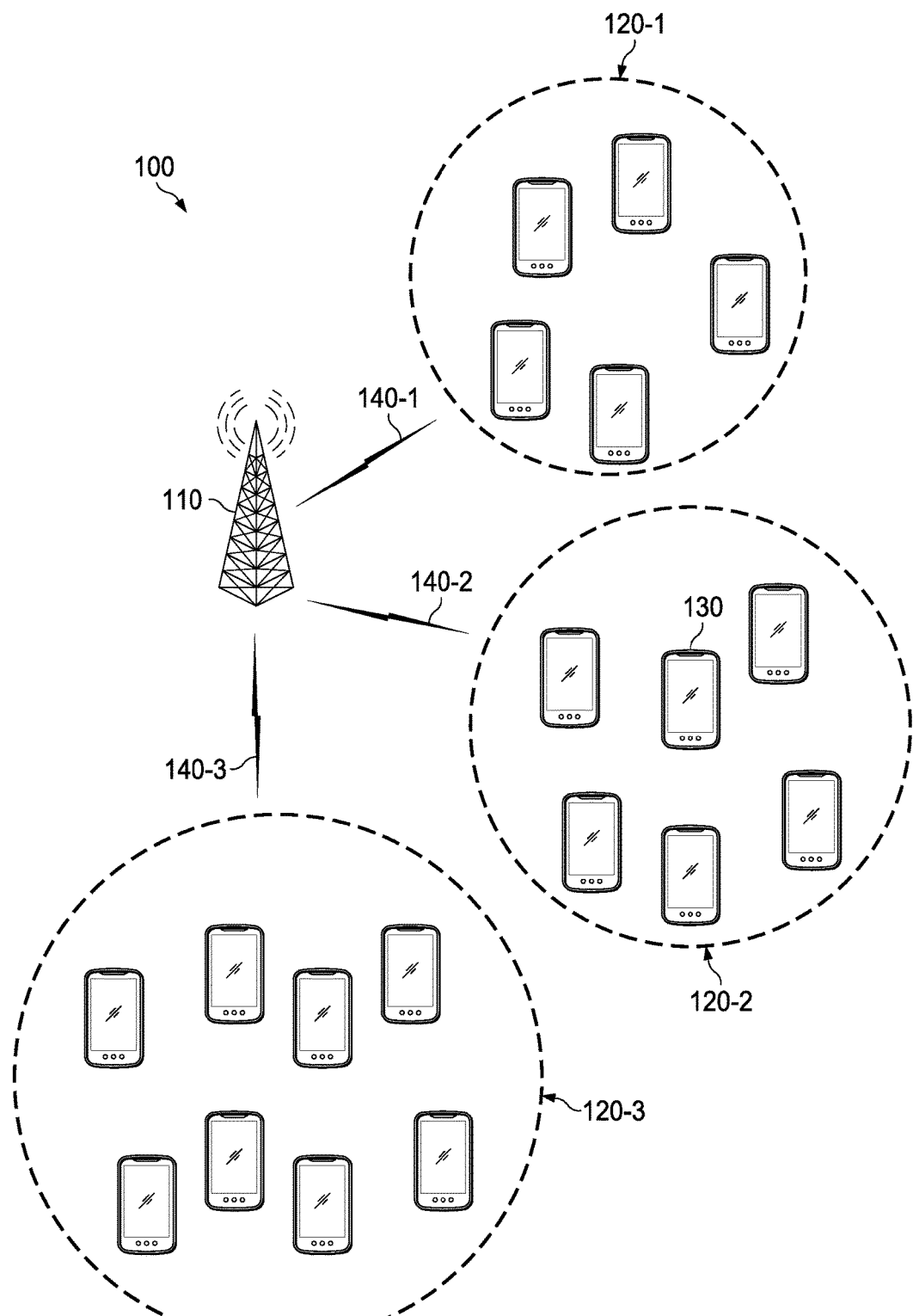
FIG. 1 is a diagram of one embodiment of a wireless network.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

In an embodiment, SCMA encoding encodes binary data streams directly to multi-dimensional codewords rather than using a quadrature amplitude modulation (QAM) symbol, as is done in code division multiple access (CDMA). SCMA encoding provides multiple access by assigning different sparse codewords generated from sparse codebooks for each multiplexed layer, as opposed to using spreading sequences common in CDMA encoding. A multiplexed layer is one that multiple data streams may be communicated over shared resources. For example, the shared resources can be multiple-input multiple-output (MIMO) spatial layers, orthogonal frequency division multiple access (OFDMA) tones, and time division multiple access (TDMA) layers time slots, among others. Sparse codebooks include sparse codewords that allow receivers to use low complexity MPAs to detect respective codewords among the multiplexed codewords, which reduces baseband processing complexity at the receiver.

It is realized herein the general requirement that SCMA signals received at a base station should be synchronized can be relaxed. Relaxing the synchronization requirement allows a certain amount of signaling overhead to be eliminated, including timing adjustment signaling from the base station to the various transmit devices. The synchronization requirements can be relaxed, it is realized herein, by taking advantage of the simplicity with which local groups of transmit devices can be synchronized. It is further realized herein that transmit devices can be grouped together according to their location and mobility. Device groups can then be allocated, or assigned, regions of the resource block reserved for SCMA transmissions. SCMA transmissions are made over channels defined by time and frequency resources. The resource block can be partitioned into resource regions that can be individually allocated to the device groups, thereby separating asynchronous groups of devices with respect to their time and frequency resources.

It is also realized herein that asynchronous SCMA transmissions in adjacent resource regions can create inter-resource region interference. To mitigate the interference, for a given device group and assigned resource region, digital filters designed for each resource region can be used to filter out side-lobes from SCMA signals originating from other transmit devices in other device groups. It is further realized herein the filtering of the SCMA signals can occur at the transmitter, e.g., UE, mobile device, etc., and at the receiver, e.g., base station, evolved node B (eNB), etc. Certain embodiments can use analog filters for each resource region, however, these embodiments are not as flexible as digital filter embodiments that can adapt to fluctuating bandwidth requirements of various device groups and their corresponding resource regions.

FIG. 1 is a diagram of one embodiment of a wireless network 100. Wireless network 100 includes a base station 110 within which the method of resource allocation and method of receiving asynchronous SCMA signals introduced herein may be embodied. Base station 110 serves one or more devices by receiving uplink (UL) communications originating from the devices and forwarding the UL communications to their respective indented destinations, or by receiving communications destined for the devices and forwarding the communications to their respective intended transmit devices. Base station 110 is sometimes referred to as an access point, a Node B, an evolved Node B (eNB), a controller, a transmit device, or a communication controller. Wireless network 100 also includes three device groups 120-1, 120-2, and 120-3. Each of the three device groups contains at least one device. Devices 130 are sometimes referred to as stations, mobile stations, mobiles, mobile devices, terminals, users, UEs, transmit devices, or subscribers.

Devices 130 can be grouped into device groups 120-1, 120-2, and 120-3 according to a variety of parameters, including one or more of the following: respective device locations, respective device mobility predictions, and respective device mobility patterns. In certain embodiments, devices 130 can be grouped by wireless network 100 or, more specifically, by base station 110. In other embodiments, devices 130 can group themselves.

Devices 130 make SCMA transmissions 140-1, 140-2, and 140-3 to base station 110. SCMA transmissions 140-1, 140-2, and 140-3 are typically made using orthogonal frequency division multiple access (OFDMA) waveforms, although other waveforms are possible. SCMA transmissions 140-1 originate from devices 130 within device group 120-1. Likewise, SCMA transmissions 140-2 originate from devices 130 within device group 120-2, and SCMA transmissions 140-3 originate from devices 130 within device group 120-3. SCMA transmissions from different device groups are asynchronous. In the embodiment of FIG. 1, SCMA transmissions 140-1 are asynchronous with respect to SCMA transmissions 140-2 and 140-3. SCMA transmissions 140-2 are also asynchronous with respect to SCMA transmissions 140-3. SCMA transmissions 140-1, 140-2, and 140-3 are asynchronous in that respective devices 130 in device groups 120-1, 120-2, and 120-3 have not been synchronized to one another. For example, devices 130 in device group 120-1 are not synchronized with devices 130 in device group 120-2. In certain embodiments, devices 130 within a particular device group are synchronized with each other. For example, a group of sensors located in a single building can be synchronized to a local timing reference or reference device located in the group or in the building, rather than synchronizing to base station 110. In another example, a group of users, i.e., mobile devices, riding in a bus can synchronize to a local timing reference or reference device in the group or in the bus, rather than synchronizing to base station 110. In other embodiments, devices 130 within the particular device group are in close enough proximity that no transmit-timing synchronization is needed for base station 110 to properly receive their SCMA signals.

By not synchronizing devices 130 in one device group with devices 130 in another device group, some overhead signaling from base station 110 can be eliminated. Typically, to globally, i.e., network-wide, synchronize devices 130, base station 110 would signal timing adjustments to each of devices 130, thereby synchronizing each to a common reference. For a small number of devices, the overhead cost associated with this process is manageable. However, as the number of devices grows, the overhead cost becomes significant.

Figure 2:
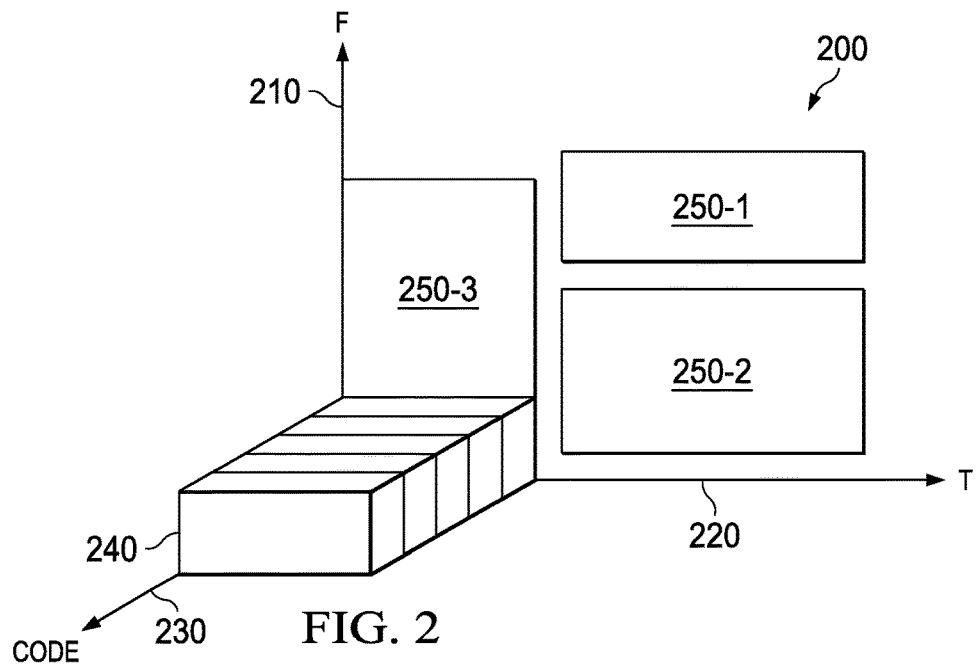
FIG. 2 is an illustration of one embodiment of a resource block.

Devices 130 make their respective SCMA transmissions using a resource block defined as a block of time and frequency resources. Devices 130 are allocated at least one time/frequency resource unit and respective sparse codebooks. FIG. 2 is an illustration of one embodiment of a resource block 200. Resource block 200 is defined in three dimensions: a frequency dimension 210, a time dimensions 220, and a code dimension 230. In code dimension 230, each time/frequency resource unit is divided into unique codes 240, which are generated from corresponding sparse codebooks.

Resource block 200 is partitioned into three resource regions 250-1, 250-2, and 250-3. The resource regions are depicted as various rectangles in the time/frequency domain. Resource regions can be any shape, although defining a time band and a frequency band naturally defines a rectangle in the time/frequency domain. Resource regions can abut one another, which is to share a boundary, or can be defined with time/frequency gaps between any two resource regions. In certain embodiments, gaps may be needed to achieve sufficiently low levels of inter-group interference. Likewise, the entire resource block 200 need not be partitioned into various resource regions. In such embodiments, various portions of resource block 200 are unassigned. Resource regions are sometimes referred to as SCMA regions or multiple access regions. Partitioning resource block 200 is carried out by the network, such as wireless network 100 from FIG. 1. More specifically, the partitioning can be carried out by base station 110. Each of resource regions 250-1, 250-2, and 250-3 are assigned to a respective device group, which is referred to as a resource region assignment. Resource regions are generally contiguously defined in the time/frequency domain. In the case of a non-contiguous resource region, the various pieces of the non-contiguous resource region are treated as independent resource regions assigned to a common device group. In embodiments having spectrum shaping filters, each non-contiguous piece of resource region would have a dedicated filter. In embodiments having resource regions assuming shapes other than rectangles, multiple spectrum shaping filters would be needed. For this reason, rectangular-shaped resource regions are desirable, although alternative implementations with otherwise-shaped resource regions are possible.

For the embodiment of FIG. 1, device groups 120-1, 120-2, and 120-3 can be respectively assigned, for example, to resource regions 250-1, 250-2, and 250-3. Resource region assignments are then communicated, or signaled, to the individual devices by base station 110. In certain embodiments, the resource region assignments can be communicated to the various device groups using multicast signaling. Again referring to the embodiment of FIG. 1, devices 130 then make their respective SCMA transmissions using their respective assigned resource region.

Figure 3:
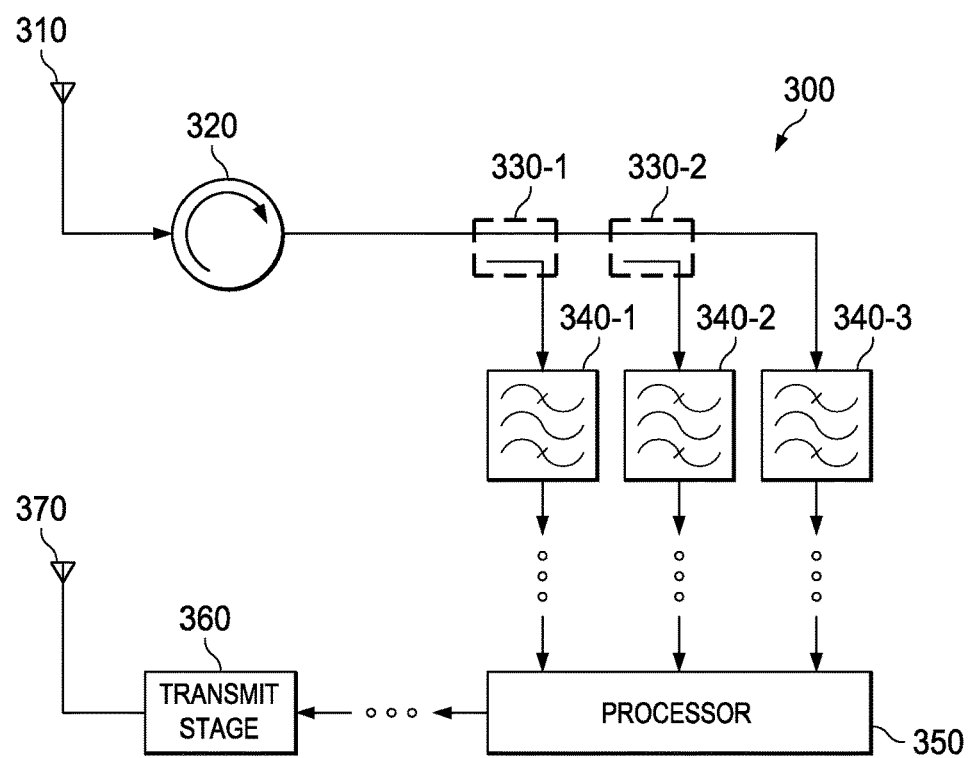
FIG. 3 is a block diagram of one embodiment of a base station.

FIG. 3 is a block diagram of one embodiment of a base station 300. Base station 300 includes an antenna 310, a mixer 320, couplers 330-1 and 330-2, filters 340-1, 340-2, and 340-3, and processor 350. Base station 300 also includes a transmit stage 360 and another antenna 370. Base station 300 can also include a variety of other components not illustrated in FIG. 3, such as amplifiers, analog-to-digital converters, decoders, application specific integrated circuits (ASICS), field programmable gate arrays (FPGAs), dedicated logic circuitry, oscillators, and many other components. These additional components, in various embodiments of base station 300, can appear anywhere in the circuit illustrated in FIG. 3, including between any two elements of base station 300.

Antenna 310 is configured to receive SCMA signals from various transmit devices. In certain embodiments, the SCMA transmissions are made using filtered OFDMA waveforms. For further information on filtered OFDMA, refer to U.S. patent application Ser. No. 14/231,217, which is incorporated herein by reference. The received SCMA signals are radio frequency (RF) transmissions that are down-converted by mixer 320 to baseband signals. The baseband SCMA signals are then passed through filters 340-1, 340-2, and 340-3. The received SCMA signals arrive at base station 300 on channels defined by respective allocations of time and frequency resources. These allocations are made by processor 350 according to a partitioning of a resource block into resource regions, as in, for example, resource block 200 of FIG. 2, and assignment of those resource regions to respective device groups, such as device groups 120-1, 120-2, and 120-3 of FIG. 1. The respective device groups contain the various transmit devices. Resource region assignments made by processor 350 are communicated to the various transmit devices through transmit stage 360 and antenna 370.

In certain embodiments, the various transmit devices are grouped into device groups by base station 300, particularly processor 350. The base station may transmit, and a UE may receive, a message indicating a plurality of UEs belonging to a device group of which the UE is a member. In other embodiments, the various transmit devices themselves form the device groups. For example, a UE may determine a composition of a device group according to respective locations of a plurality of UEs in the device group. The groupings or compositions of the device groups are communicated by message from the devices or UEs of the respective device groups to base station 300. The UE may communicate by message the devices or UEs belonging to its device group to the base station, or to at least one other UE of the UEs in the device group. The grouping of the various transmit devices can be done according to a variety of parameters, including the respective locations of the various transmit devices and respective mobility predictions and patterns for the various transmit devices. Transmit devices in one device group make SCMA transmissions that are asynchronous to SCMA transmissions made by another device group. In certain embodiments, SCMA transmissions made by two transmit devices in the same device group are synchronous. The synchronous SCMA transmissions can be synchronous as a consequence of their proximity to one another or, in certain embodiments, because transmit devices in that device group are synchronized to a common reference. Asynchronous refers to signals from different device groups arriving at different times.

Filters 340-1, 340-2, and 340-3 are each digital filters designed for a specific resource region to shape the spectrum such that inter-resource region interference is reduced, possibly eliminated. Inter-resource region interference, or inter-SCMA region interference, is caused by asynchronous SCMA transmissions by transmit devices in different device groups over adjacent resource regions. In other words, interference results from two or more asynchronous SCMA transmissions over adjacent time/frequency resources. Filters 340-1, 340-2, and 340-3 are designed to block sidelobes of OFDMA waveforms carrying asynchronous SCMA signals in adjacent resource regions. Doing so allows base station 300 to properly receive the asynchronous SCMA signals. The filtered SCMA signals are then decoded and the payload data ultimately passed to processor 350.

Processor 350 can be implemented in one or more processors, one or more ASICs, one or more FPGAs, dedicated logic circuitry, or any combination thereof, all collectively referred to as a processor. The respective functions for processor can be stored as instructions in non-transitory memory for execution by the processor.

Figure 4:
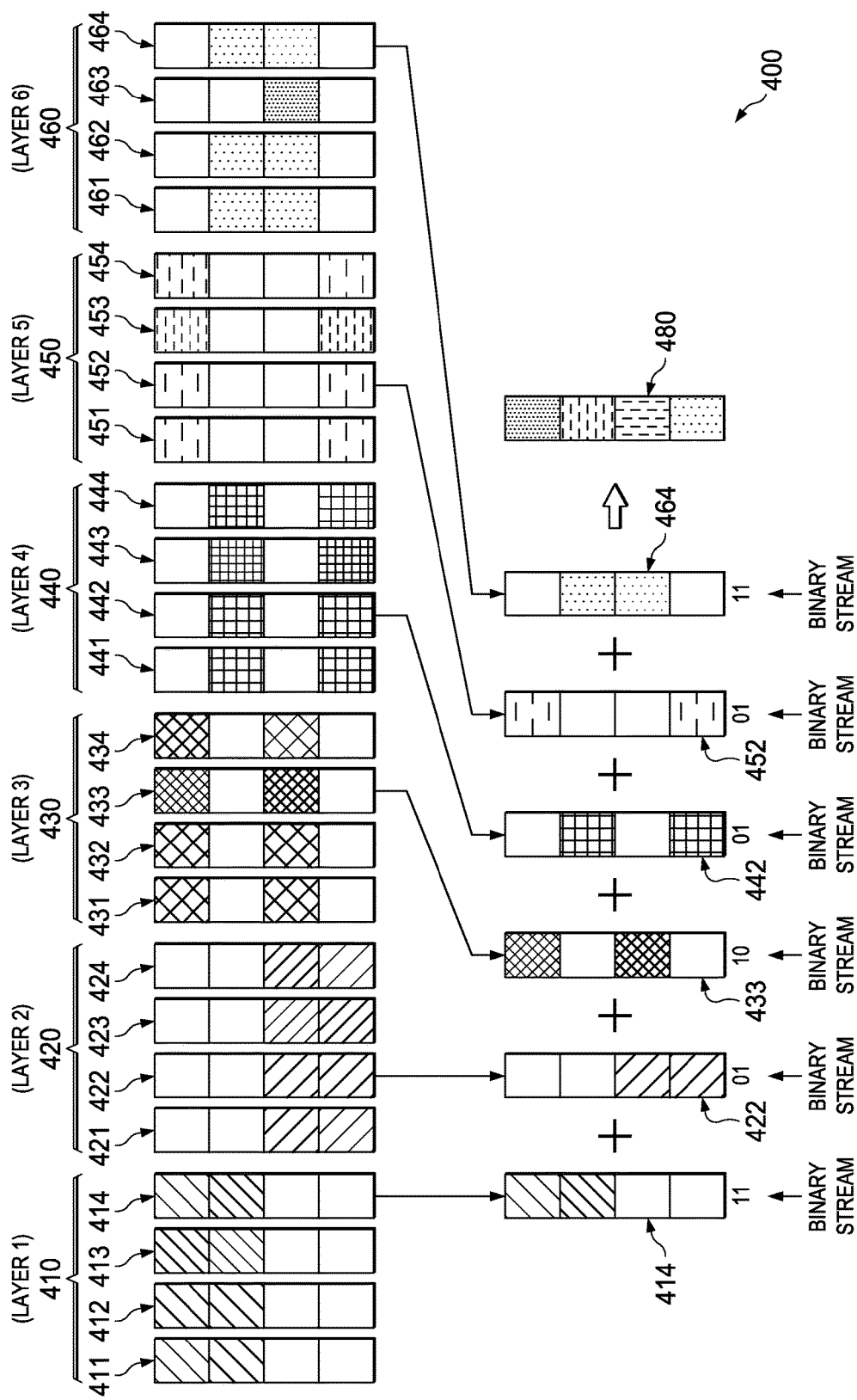
FIG. 4 is an illustration of an SCMA encoding scheme.

FIG. 4 is an illustration of an SCMA encoding scheme 400. SCMA encoding scheme 400 uses multiple sparse codebooks 410, 420, 430, 440, 450, and 460, each of which is assigned to a different multiplexed layer and includes multiple multi-dimensional codewords. More specifically, sparse codebook 410 includes codewords 411-414, sparse codebook 420 includes codewords 421-424, sparse codebook 430 includes codewords 431-434, sparse codebook 440 includes codewords 441-444, sparse codebook 450 includes codewords 451-454, and sparse codebook 460 includes codewords 461-464. Each codeword is mapped to a different binary value. In the embodiment of FIG. 4, codewords 411, 421, 431, 441, 451, and 461 are mapped to the binary value '00,' codewords 412, 422, 432, 442, 452, and 462 are mapped to the binary value '01,' codewords 413, 423, 433, 443, 453, and 463 are mapped to the binary value '10,' and codewords 414, 424, 434, 444, 454, and 464 are mapped to the binary value '11.' Although the sparse codebooks of the embodiment of FIG. 4 include four codewords apiece, sparse codebooks for SCMA can include any number of codewords. For example, certain embodiment sparse codebooks may have eight codewords mapped to binary values '000' to '111,' while other embodiments may include 16 codewords mapped to binary values '0000' to '1111,' or more.

Different codewords are selected from the various sparse codebooks depending on the binary data to be transmitted over the respective multiplexed layers. In the embodiment of FIG. 4, codeword 414 is selected from sparse codebook 410 because the binary value '11' is to be transmitted over the first multiplexed layer. Codeword 422 is selected from sparse codebook 420 because the binary value '01' is being transmitted over the second multiplexed layer. Codeword 433 is selected from sparse codebook 430 because the binary value '10' is to be transmitted over the third multiplexed layer. Codeword 442 is selected from sparse codebook 440 because the binary value '01' is to be transmitted over the fourth multiplexed layer. Codeword 452 is selected from sparse codebook 450 because the binary value '01' is to be transmitted over the fifth multiplexed layer. Codeword 464 is selected from sparse codebook 460 because the binary value '11' is to be transmitted over the sixth multiplexed layer. Codewords, 414, 422, 433, 442, 452, and 464 are then multiplexed together to form a multiplexed data stream 480, which is transmitted over shared resources. Codewords 414, 422, 433, 442, 452, and 464 are sparse codewords that can be identified upon receipt of multiplexed data stream 480 at the receiver using an MPA.

Figures 5, 6:
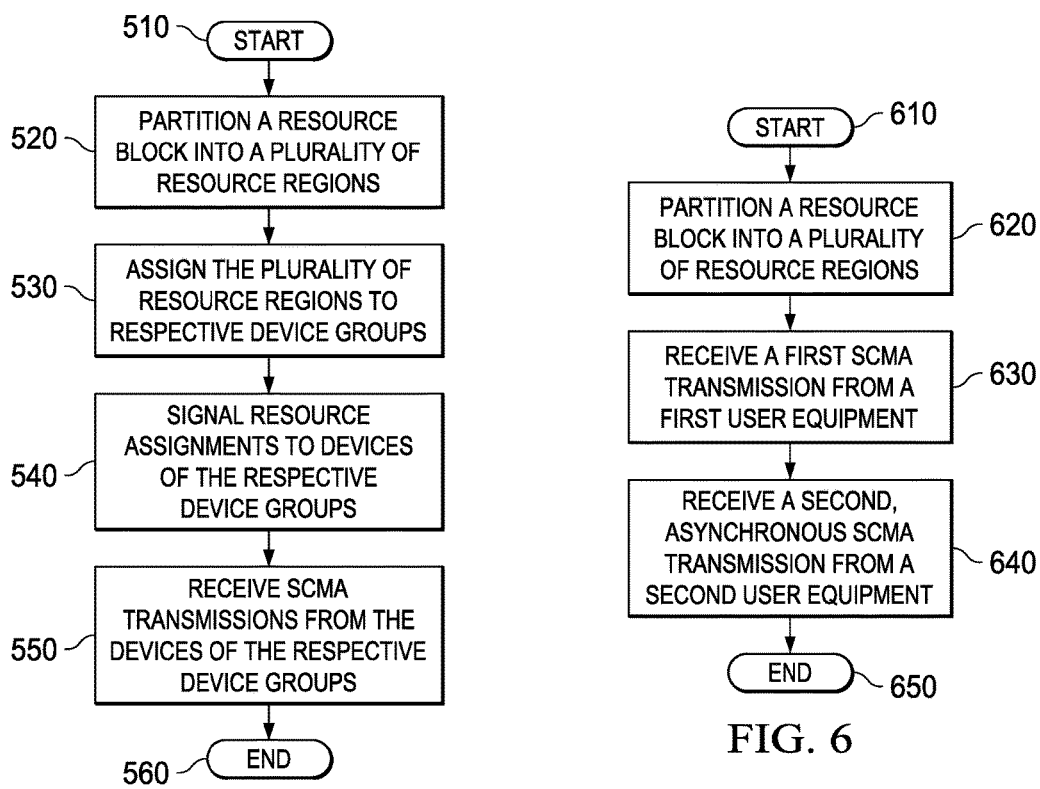
FIG. 5 is a flow diagram of one embodiment of a method of resource allocation for SCMA transmissions.
FIG. 6 is a flow diagram of one embodiment of a method of receiving asynchronous SCMA transmissions.

FIG. 5 is flow diagram of one embodiment of a method of resource allocation for SCMA signals. The method begins at a start step 510. At a partitioning step 520, a base station partitions a resource block into a plurality of resource regions. The resource block is defined as a block of time, frequency, and codebook resources. At an assigning step 530, the resource regions are assigned to respective device groups. Transmit devices are grouped into the device groups according to their respective locations. In certain embodiments, the transmit devices are grouped into the device groups according to respective mobility predictions and patterns for the transmit devices.

The resource region assignments are signaled to the transmit devices at a communicating step 540. The resource region assignments need not be communicated to the transmit devices for every data transmission. The transmit devices make their respective SCMA transmissions using their respective assigned resource regions. The SCMA signals are received at by the base station at a receiving step 550. The SCMA transmissions are asynchronous from device group to device group. In certain embodiments, the method also includes filtering the SCMA signals using, e.g., spectrum shaping filters corresponding to the respective resource regions, in order to filter out inter-resource region interference caused by the asynchronous transmissions. The filtering allows the base station receivers to properly receive, decode, and detect the SCMA signals. The method ends at an end step 560.

FIG. 6 is a flow diagram of one embodiment of a method of receiving asynchronous SCMA signals. The method begins at a start step 610. At a base station, at a partitioning step 620, a resource block is partitioned into a plurality of resource regions. The resource regions are assigned to respective device groups. The device groups each contain at least one transmit device, i.e., UE. In certain embodiments, the UEs are grouped into the device groups according to their respective locations. In some embodiments the UEs are grouped according to respective mobility predictions and patterns for the UEs. The grouping can be carried out, in certain embodiments, by the base station while, in other embodiments, the grouping is carried out by the UEs themselves.

The device groups of UEs are assigned to the resource regions and the assignments are communicated to the UEs. The device groups can contain any number of UEs. UEs within a given device group transmit using resource region assigned to the device group. At a first receiving step 630, a first SCMA signal is received at the base station from a first UE. The first UE makes the first SCMA transmission using a first resource region of the plurality of resource regions. In certain embodiments, multiple sparse codewords, or layers, can be superposed on the first resource region. At a second receiving step 640, a second SCMA signal is received at the base station from a second UE. The second UE makes the second SCMA transmission using a second resource region of the plurality of resource regions. Because the first UE and the second UE are in different device groups and assigned different resource regions, the first SCMA transmission and the second SCMA transmission are asynchronous. The first UE and second UE have not been synchronized to a common reference. In certain embodiments, for the base station to properly receive the SCMA signals, the first SCMA signal and the second SCMA signal are passed through filters designed for their respective resource regions. Each filter, designed for a specific resource region, is configured to filter out the interference caused by asynchronous SCMA transmissions from neighboring resource regions. The method ends at an end step 650.

Figure 7:
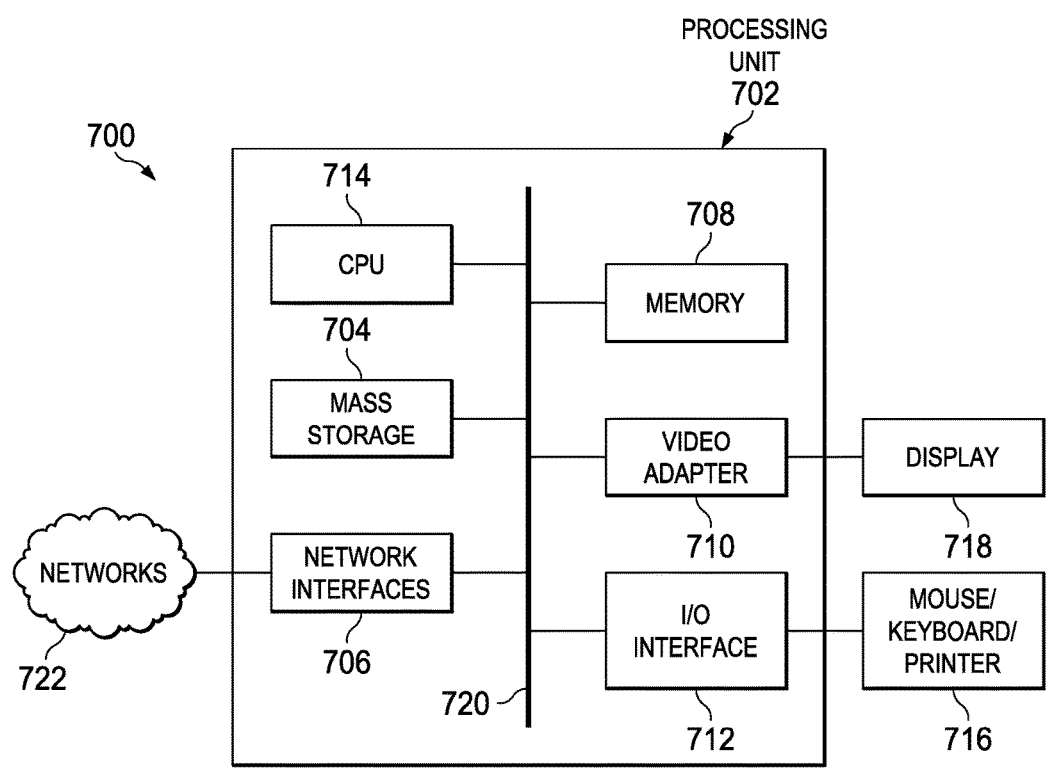
FIG. 7 is a block diagram of one embodiment of a computing system.

FIG. 7 is a block diagram of a computing system 700 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 may comprise a processing unit 702 equipped with one or more input/output devices, such as a speaker, microphone, mouse, touchscreen, keypad, keyboard, printer, display, and the like. The processing unit may include a central processing unit (CPU) 714, memory 708, a mass storage device 704, a video adapter 710, and an I/O interface 712 connected to a bus 720.

The bus 720 may be one or more of any type of several bus architectures including a memory bus or memory controller, a peripheral bus, video bus, or the like. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, an optical disk drive, or the like.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for a printer.

The processing unit 702 also includes one or more network interfaces 706, which may comprise wired links, such as an Ethernet cable or the like, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of resource allocation for non-orthogonal multiple access signals, comprising:
    signaling resource region assignments to devices of respective device groups in a plurality of device groups, the resource region assignments assigning a plurality of resource regions of a resource block to the respective device groups, the plurality of device groups comprising a first device group and a second device group; and
    receiving the non-orthogonal multiple access signals from the devices of the respective device groups, wherein non-orthogonal multiple access signals from devices in the first device group are received synchronously with non-orthogonal multiple access signals from other devices in the first device group, the non-orthogonal multiple access signals from devices in the first device group are received asynchronously with non-orthogonal multiple access signals from devices in the second device group, and the non-orthogonal multiple access signals from devices in the second device group are received synchronously with non-orthogonal multiple access signals from other devices in the second device group.

2. The method of claim 1 further comprising filtering received non-orthogonal multiple access signals, wherein the filtering is carried out by respective spectrum shaping filters for the plurality of resource regions.

3. The method of claim 1 further comprising transmitting a message to the devices indicating a grouping of the devices into the respective device groups according to respective locations of the devices.

4. The method of claim 3 wherein the devices are grouped by a base station.

5. The method of claim 1 wherein the devices are grouped by the devices of the respective device groups.

6. The method of claim 5 further comprising receiving a message from one of the devices of the respective device groups indicating a grouping of the devices into the respective device groups.

7. The method of claim 1 further comprising grouping the devices into the respective device groups according to respective mobility predictions for the devices.

8. The method of claim 1 furthering comprising synchronizing the devices of a given device group with other devices of the given device group.

9. The method of claim 1 wherein the resource block is defined by a block of time and frequency resources.

10. The method of claim 1, wherein the non-orthogonal multiple access signals are sparse code multiple access (SCMA) signals.

11. A method of receiving non-orthogonal multiple access signals, comprising:
    receiving a first non-orthogonal multiple access signal from a first device, wherein the first non-orthogonal multiple access signal uses a first resource region of a plurality of resource regions of a partitioned resource block;
    receiving a second non-orthogonal multiple access signal from a second device, wherein the second non-orthogonal multiple access signal uses a second resource region of the plurality of resource regions, wherein the second non-orthogonal multiple access signal is received asynchronously with the first non-orthogonal multiple access signal; and
    receiving a third non-orthogonal multiple access signal from a third device, wherein the third non-orthogonal multiple access signal uses the second resource region of the plurality of resource regions, wherein the third non-orthogonal multiple access signal is received synchronously with respect to the second non-orthogonal multiple access signal, and wherein the third non-orthogonal multiple access signal is received asynchronously with respect to the first non-orthogonal multiple access signal.

12. The method of claim 11 further comprising:
    signaling an assignment of the first resource region to a first group of devices containing the first device; and
    signaling an assignment of the second resource region to a second group of devices containing the second device and the third device.

13. The method of claim 12 further comprising:
    signaling an assignment of the first device to the first group of devices according to a proximity of the first device to the first group of devices; and
    signaling an assignment of the second and third devices to the second group of devices according to a proximity of the second and third devices to the second group of devices.

14. The method of claim 11 further comprising:
    passing the first non-orthogonal multiple access signal through a first filter having a first pass band corresponding to the first resource region; and
    passing the second non-orthogonal multiple access signal and the third non-orthogonal multiple access signal through a second filter having a second pass band corresponding to the second resource region.

15. A method of transmitting a non-orthogonal multiple access signal, comprising:

receiving, at a device, a resource region assignment indicating a first resource region of a resource block assigned to a first device group of which the device is a member; and transmitting the non-orthogonal multiple access signal to a base station using time and frequency resources of the first resource region assigned according to the resource region assignment, wherein the transmitting to the base station is carried out synchronously with a local timing reference for devices in the first device group, the transmitting is carried out asynchronously with respect to non-orthogonal multiple access signals transmitted to the base station by devices in a second device group having a different resource region assignment indicating a second resource region of the resource block, and the non-orthogonal multiple access signals transmitted by the devices in the second device group are transmitted synchronously with respect to one another using time and frequency resources of the second resource region.

16. The method of claim 15 further comprising:
communicating a composition of the first device group to the base station according to respective locations of a plurality of devices in the first device group.

17. The method of claim 16 further comprising communicating the composition of the first device group to at least one device of the plurality of devices in the first device group.

18. The method of claim 15 further comprising receiving a message indicating a plurality of devices belonging to the first device group.

19. The method of claim 18 wherein receiving the message comprises receiving the message from the base station.

20. The method of claim 15, wherein the non-orthogonal multiple access signal is a sparse code multiple access (SCMA) signal.

21. A base station comprising:
a transmitter configured to signal resource region assignments to devices of respective device groups in a plurality of device groups, the resource region assignments assigning a plurality of resource regions of a resource block to the respective device groups, the plurality of device groups comprising a first device group and a second device group; and
a receiver configured to receive non-orthogonal multiple access signals from the devices of the respective device groups, wherein the non-orthogonal multiple access signals from devices in the first device group are received synchronously with non-orthogonal multiple access signals from other devices in the first device group, the non-orthogonal multiple access signals from devices in the first device group are received asynchronously with non-orthogonal multiple access signals from devices in the second device group, and the non-orthogonal multiple access signals from devices in the second device group are received synchronously with non-orthogonal multiple access signals from other devices in the second device group.

22. The base station of claim 21, further comprising respective spectrum shaping filters adapted to filter received non-orthogonal multiple access signals from the devices of the respective device groups for the plurality of resource regions.

23. The base station of claim 21, wherein the transmitter is further configured to transmit a message to the devices indicating a grouping of the devices into the respective device groups according to respective locations of the devices or respective mobility predictions for the devices.

24. The base station of claim 21, wherein the receiver is further configured to receive a message from a device of the respective device groups indicating a grouping of the devices into the respective device groups.

25. The base station of claim 21, wherein the non-orthogonal multiple access signals are a sparse code multiple access (SCMA) signals.

26. A device comprising:
a receiver configured to receive a resource region assignment indicating a first resource region of a resource block assigned to a first device group of which the device is a member; and
a transmitter configured to transmit a non-orthogonal multiple access signal to a base station using time and frequency resources of the first resource region assigned according to the resource region assignment, wherein the transmitting to the base station is carried out synchronously with a local timing reference for devices in the first device group, the transmitting is carried out asynchronously with respect to non-orthogonal multiple access signals transmitted to the base station by devices in a second device group having a different resource region assignment indicating a second resource region of the resource block, and the non-orthogonal multiple access signals transmitted by the devices in the second device group are transmitted synchronously with respect to one another using time and frequency resources of the second resource region.

27. The device of claim 26, wherein the transmitter is further configured to communicate, to the base station, a composition of the first device group according to respective locations of a plurality of devices in the first device group.

28. The device of claim 26, wherein the receiver is further configured to receive, from the base station, a message indicating a plurality of devices belonging to the first device group.

29. The device of claim 26, wherein the non-orthogonal multiple access signal is a sparse code multiple access (SCMA) signal.

* * * * *